E. H. WAUGH.
FISH CLEANING DEVICE.
APPLICATION FILED DEC. 8, 1917.
1,306,841.
Patented June 17, 1919.
3 SHEETS—SHEET 3.
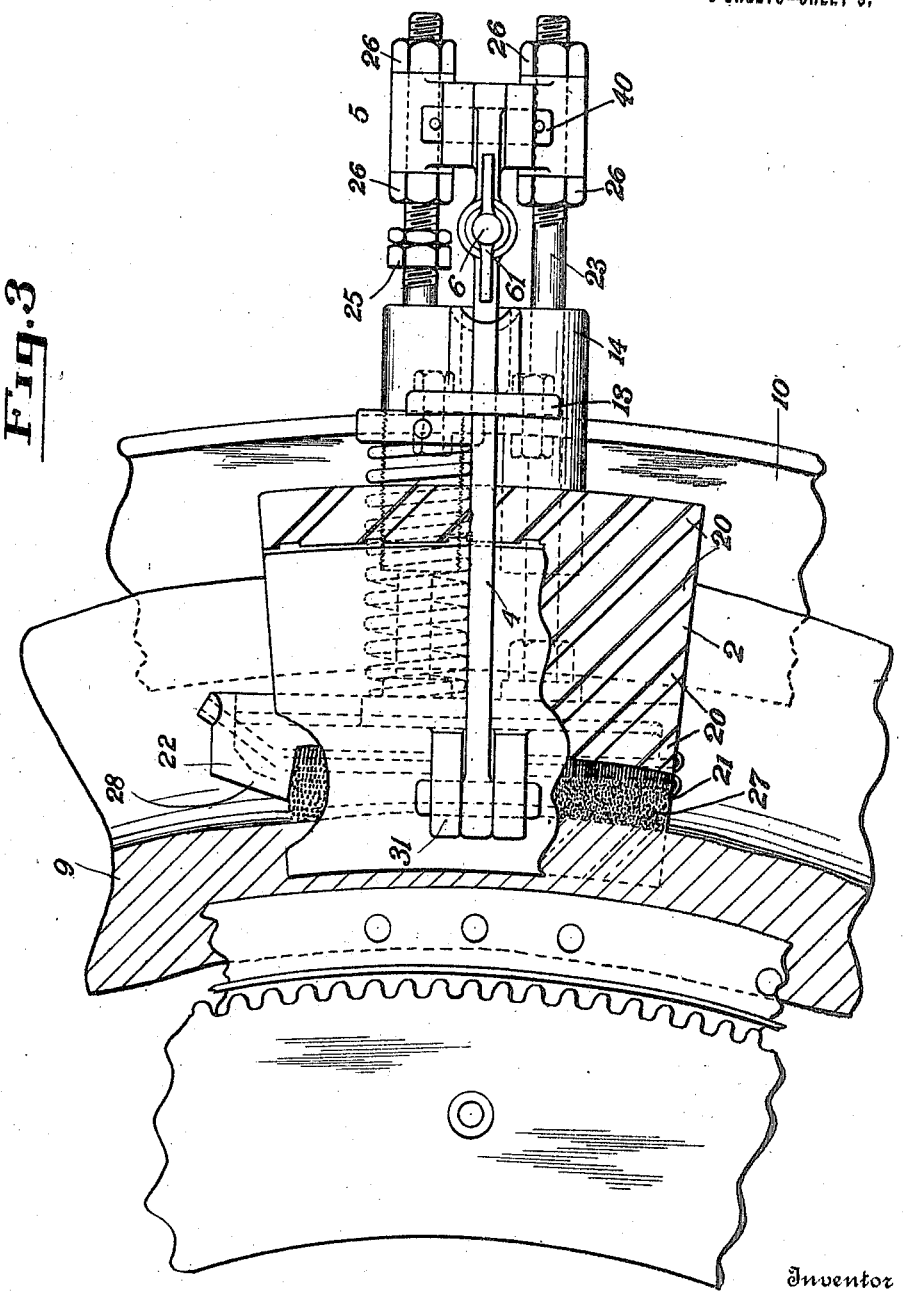
Inventor
Edward H. Waugh
By Henry L. Reynolds.
Attorney

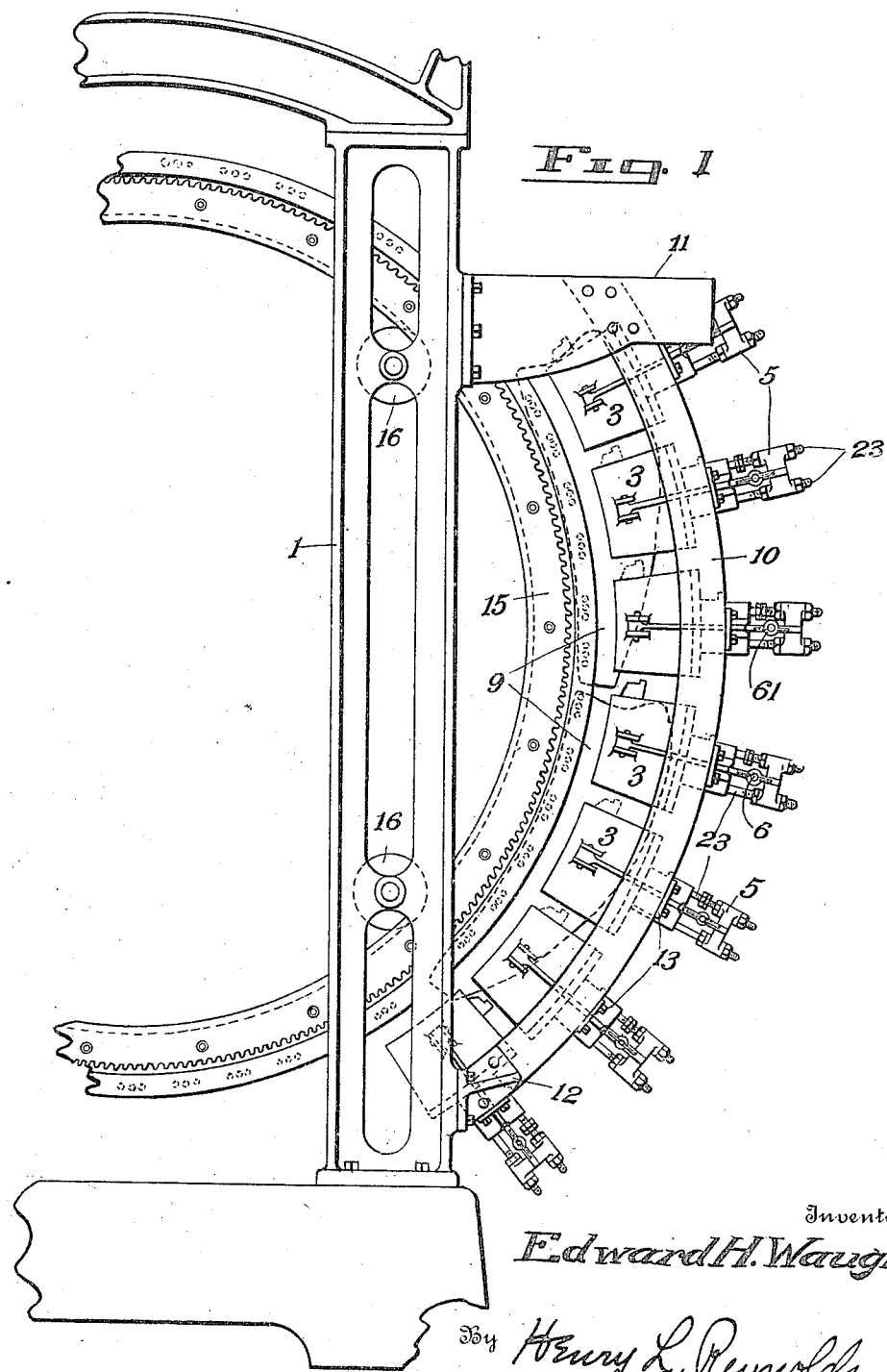

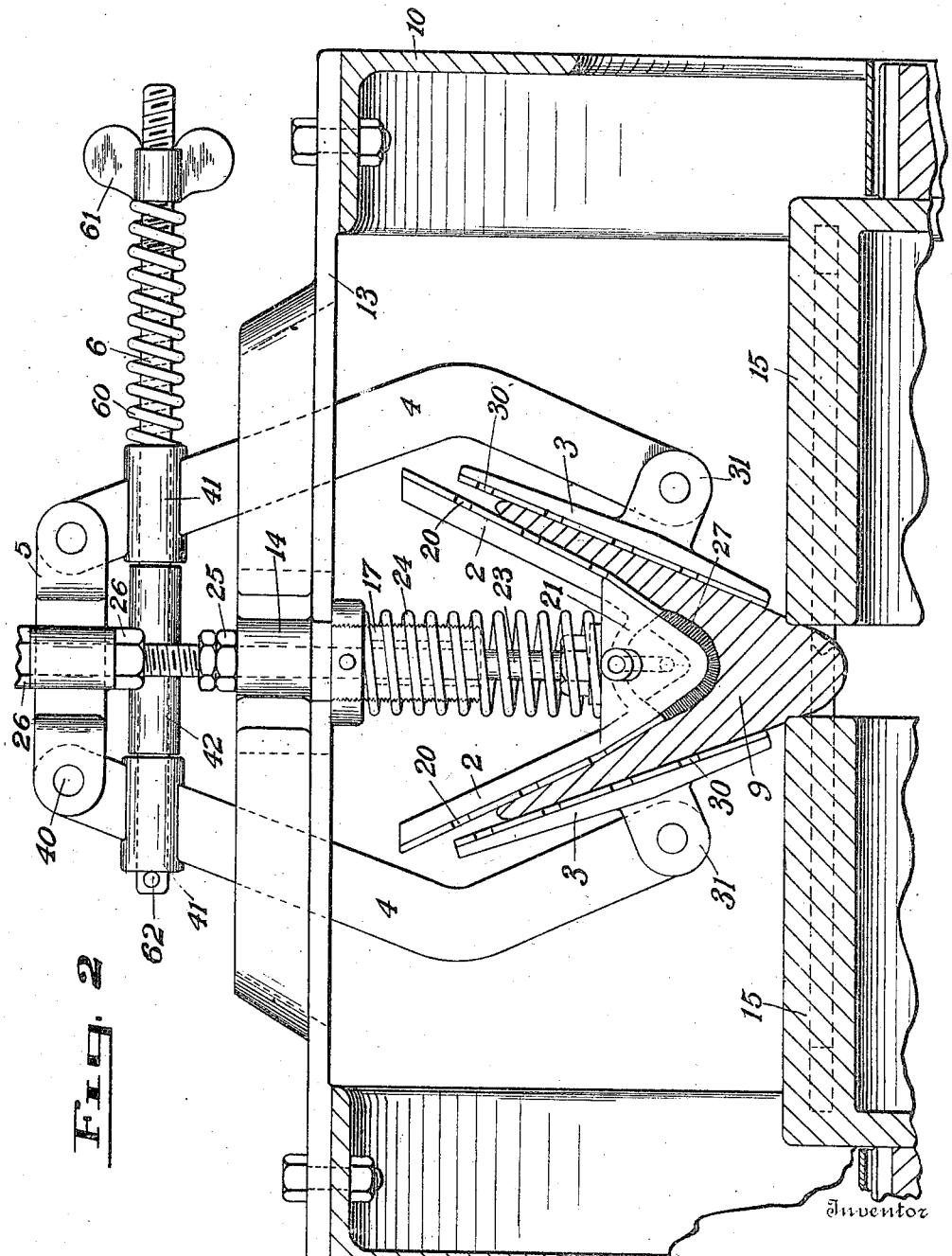

UNITED STATES PATENT OFFICE.

EDWARD H. WAUGH, OF SEATTLE, WASHINGTON, ASSIGNOR TO SMITH CANNERY MACHINES COMPANY, OF SEATTLE, WASHINGTON, A CORPORATION OF WASHINGTON.

FISH-CLEANING DEVICE.

1,306,841.      Specification of Letters Patent.      Patented June 17, 1919.

Application filed December 8, 1917. Serial No. 206,276.

*To all whom it may concern:*

Be it known that I, EDWARD H. WAUGH, a citizen of the United States, and resident of the city of Seattle, county of King, and State of Washington, have invented certain new and useful Improvements in Fish-Cleaning Devices, of which the following is a specification.

My invention relates to improvements in fish cleaning machines, and comprises the novel parts and combinations of parts which will be hereinafter described and then particularly defined by the claims.

The object of my invention is to provide means for the better cleaning of the fish after they have been opened and the major part of the viscera removed.

In the accompanying drawings I have shown my invention in the type of construction which is now most preferred by me.

Figure 1 is a side elevation of a portion of a fish dressing machine, showing the manner of applying my present improvement thereto.

Fig. 2 is a cross section taken upon a radial axial plane of the machine, showing one of my improved cleaning devices in detail.

Fig. 3 is a side elevation, with parts broken away and in section, of one of the cleaning devices.

My present invention is designed for application to fish dressing machines of the type shown in the two patents to E. A. Smith, No. 998,129, of July 18, 1911, and No. 1,034,525, of August 6, 1912.

I do not contemplate by my present invention displacing any of the apparatus shown upon the said machine and employed for dressing fish. I contemplate using substantially all of the apparatus shown therein but contemplate enlarging the size of the fish-carrying rings, or wheels, so as to provide room for the application of my cleaning devices herein shown, which cleaning devices follow, in order of their use, the devices shown in the said patents. As the manner of handling the fish is in all essential respects to be the same as shown and described in the said patents, a description of these parts is not herein considered necessary.

The rotative rings 15, which are provided with means for engaging and holding the fish, are herein shown as mounted to turn upon a set of rollers 16 which are carried by a frame 1, in this respect differing slightly in means, but not in principle, from the construction shown in said patents. These rings are provided with means for engaging the fish and carrying the same after the manner described in the patents referred to.

In Fig. 1, I have shown seven cleaning devices as placed to engage with the fish after the same has been operated upon by the cleaning devices formerly employed. Each of these devices is essentially alike in construction and a description of one of them will be sufficient. These devices are shown in detail in Figs. 2 and 3. Each comprises an inner scraper and an outer scraper which are mounted in such manner that they are automatically adjustable inwardly and outwardly in relation to the fish-carrying rings 15, by the variation in the size of the fish, and in which the outer cleaners 3 are movable outwardly or inwardly to accommodate different thicknesses of the sides or flanks of the fish.

The inner cleaner, being the cleaner which acts upon the interior of the fish but which is outwardly located with respect to the fish carrying rings 15, has two plates 2, which are secured together in diverging relation and have their outer surfaces, or the surfaces which contact with the inner surface of the flanks of the fish, corrugated, or provided with ribs 20, for scraping the inner surface of the fish.

These ribs are preferably placed in a diagonal position, as is clearly shown in Fig. 3, the angle of these ribs being such that the end thereof which first engages the fish, is the end which is toward the back of the fish. In consequence, the tendency of the scraping of the fish by these ribs is to pull the sides of the fish outward.

The body 21, to which the flanks 2 are secured, has its apex of a rounded contour, which consists of a brush member 27. This brush member is composed of bristle-like material and extends throughout a greater portion of the length of the scraper. This bristle portion thoroughly brushes the part of the interior cavity of the fish which is next to the back bone. This portion of the scraper acts to thoroughly clean the fish of the coagulated blood which usually forms along the back bone.

The portion 22, which forms the forward end of this part of the scraper, is made solid and has an inclined surface 28 which by riding upon the body of the fish, assists in properly positioning the scraper with relation to the fish. This inclined surface engaging the fish will force the scraper outward to accommodate the thicker fish and thus controls the position of the scraper when in action.

The inner scraper is secured to two bars 23, which extend outwardly, or in the general direction of the radius of the fish-carrying rings 15. These rods 23 are mounted to slide in guide members 14, which are in the form of bosses carried by a bar 13 which connects the two supporting bars 10. These bars 10 are in the form of arcs of circles which are secured at opposite ends to bars 12 which connect the posts of the frame 1 and to brackets 11 which extend outward from the frame.

The guides 14 are shown as having an inward extension 17 whereby the rods 23 are given a longer bearing support. Springs 24, which are helically coiled, surround the rods 23 and bear at one end upon the inner scraper and at the other end against the bar 13, to thereby yieldingly hold the scraper inward, or toward the fish in passing. Adjustable stop nuts 25 are secured to the rods 23 on the outer side of the guide 14, thereby limiting the inward movement of the scraper.

The outer scraper consists of two plates 30 which are provided with ears 31, by which they are pivotally secured to lever arms 4, which arms extend outwardly and are pivotally mounted by pins 40, upon a member 5, which is secured upon the guide rods 23, whereby these lever arms and the outer scrapers 3, are caused to move inward and outward in conformity with the movements of the inner scraper. The pivotal supports for the scrapers furnished by the arms 4, also permit them to swing toward and from the inner scraper.

The inner surface of the outer scrapers are also preferably constructed with diagonally placed ribs 30, similar to the construction adopted for the inner scraper. The direction of the inclines for these ribs corresponds with that used for the inner scraper, whereby the tendency is to draw the flanks of the fish outward.

Toward the outer or pivotal ends of the arms 4, they are provided with bosses 41, through which pass a bolt 6. This bolt, at one end, is provided with means for preventing its being withdrawn, said means, as illustrated, consisting of a pin 62 passing through its end. Between the two bosses 41 is placed a stop or spacing member 42, which limits the swing of these arms toward each other and consequently, the approach of the outer scraper toward the inner scraper.

The rod 6 projects at one end and has a spring 60 surrounding the same and having, at its outer end, an adjustable thumb nut 61, by which means the lever arm 4 and the outer scraper are yieldingly pressed toward each other, and yet they are permitted to separate as may be necessary to accommodate fish having different thicknesses of sides.

It has been found, in operating the fish dressing machine shown in the patents to Smith referred to, that the cleaning apparatus, as shown in said patents, does not perform a perfect cleaning operation. It has been found in practice necessary to have what is known as a sliming gang to finish up and perform the final cleaning operations needed to make a perfect job. I have found that with the cleaning devices herein described, used to follow up the work as done by the aforesaid machine, the sliming gang may be very largely dispensed with, as the fish is cleaned far better than by the old machine.

What I claim as my invention is:

1. A fish cleaning device comprising a body having flaring sides provided externally with scraping ribs placed diagonal to the direction of movement of the fish, the ends of said ribs which are toward the apex of the device being advanced to first engage the fish.

2. A fish cleaning device comprising a body having flaring sides provided externally with scraping ribs placed diagonal to the direction of movement of the fish, the apex of said scraper being provided with flexible bristle-like brushing members forming a brush of rounded contour.

3. A fish cleaning device comprising a body having flaring sides provided externally with scraping ribs placed diagonal to the direction of movement of the fish, the ends of said ribs which are toward the apex of the device being advanced to first engage the fish, supporting means for said body permitting movement toward and from the fish, and springs yieldingly holding the scraper against the fish.

4. A fish cleaning device comprising a body having flaring sides provided externally with scraping ribs placed diagonal to the direction of movement of the fish, the ends of said ribs which are toward the apex of the device being advanced to first engage the fish, supporting rods extending outwardly with relation to the apex of the body, guide supports for said rods and springs acting to hold the scraper toward the fish.

5. A fish cleaning device comprising an inner scraper having flaring wings provided with outwardly extending scraping projections, an outer scraper having complemental plates provided with inwardly extending scraping projections, arms to which said latter plates are pivoted, said arms having pivotal support permitting bodily movement of their plates toward and from the inner scraper, and a spring acting to swing the plates of the outer scraper together.

6. A fish cleaning device comprising an inner scraper having flaring sides or wings, an outer scraper having complemental plates, bars carrying the inner scraper, guide supports for said bars, levers having a pivotal support from the said bars and pivotal supporting connection with the outer scrapers, and a spring acting to hold the outer scraper plates toward the inner scraper.

7. A fish cleaning device comprising an inner scraper having side wings, supporting rods therefor extending outwardly therefrom, guides for said rods, springs surrounding said rods and acting between said guides and the scraper to hold the scraper toward the fish, outer scraper plates placed complemental to the inner scraper, arms pivotally supported from the outer ends of the rods which carry the inner scraper and pivotally connected by their inner ends with said outer scraper plates, and a spring acting to swing said arms together.

8. A fish cleaning device comprising an inner scraper having side wings, supporting rods therefor extending outwardly therefrom, guides for said rods, springs surrounding said rods and acting between said guides and the scraper to hold the scraper toward the fish, outer scraper plates placed complemental to the inner scraper, arms pivotally supported from the outer ends of the rods which carry the inner scraper and pivotally connected by their inner ends with said outer scraper plates, and a spring acting to swing said arms together, and a stop interposed between said arms to limit their approach toward each other.

9. A fish cleaning device comprising scraper plates adapted to engage the outer side surfaces of a fish in passing, arms pivoted to said plates and having pivotal supports located laterally from the fish and adjacent each to the other and a spring acting to swing said arms toward each other.

10. A fish scraping device comprising a fish opening member adapted to enter the opened abdominal cavity of the fish, means for yieldingly supporting said opening member for movement toward and from the longitudinal axis of the fish, a pair of arms having a pivotal connection with the said opening member adjacent the vertical plane of the fish and at one side of the fish, scraper plates centrally pivoted to the other ends of said arms and adapted to engage the outer surfaces of the flanks of the fish, and a spring adapted to swing said plates toward the fish.

Signed at Seattle, Washington, this 27th day of November, 1917.

EDWARD H. WAUGH.

Copies of this patent may be obtained for five cents each, by addressing the "Commissioner of Patents, Washington, D. C."